US010493876B2

(12) United States Patent
Couasnon et al.

(10) Patent No.: US 10,493,876 B2
(45) Date of Patent: Dec. 3, 2019

(54) RAISING SYSTEM FOR VEHICLE SEAT

(71) Applicant: Faurecia Sièges d'Automobile, Nanterre (FR)

(72) Inventors: Christian Couasnon, Flers (FR); Sylvain Deschamps, St. Georges des Groseillers (FR)

(73) Assignee: FAURECIA SIÈGES D'AUTOMOBILE, Nanterre (FR)

( * ) Notice: Subject to any disclaimer, the term of this patent is extended or adjusted under 35 U.S.C. 154(b) by 0 days.

(21) Appl. No.: 15/721,016

(22) Filed: Sep. 29, 2017

(65) Prior Publication Data

US 2018/0086237 A1  Mar. 29, 2018

(30) Foreign Application Priority Data

Sep. 29, 2016  (FR) ...................................... 16 59386

(51) Int. Cl.
*B60N 2/06*  (2006.01)
*B60N 2/16*  (2006.01)
*B60N 2/18*  (2006.01)
*B60N 2/42*  (2006.01)
*B60N 2/427*  (2006.01)

(52) U.S. Cl.
CPC ......... *B60N 2/42736* (2013.01); *B60N 2/165* (2013.01); *B60N 2/1615* (2013.01); *B60N 2/1803* (2013.01); *B60N 2/4221* (2013.01); *B60N 2/42709* (2013.01); *B60N 2/42781* (2013.01)

(58) Field of Classification Search
CPC .......................... B60N 2/42736; B60N 2/1803; B60N 2/4221; B60N 2/1615; B60N 2/165

USPC .......................... 297/344.15, 344.16, 344.17
See application file for complete search history.

(56) References Cited

U.S. PATENT DOCUMENTS

| 6,334,643 | B1 * | 1/2002 | Lindblad | B60N 2/4228 |
| | | | | 296/65.09 |
| 6,347,778 | B1 * | 2/2002 | Koga | B60N 2/1615 |
| | | | | 248/421 |
| 6,733,075 | B2 | 5/2004 | Schumann et al. | |

(Continued)

FOREIGN PATENT DOCUMENTS

| DE | 19953758 C1 | 3/2001 |
| DE | 10137298 C1 | 10/2002 |
| FR | 2915145 A1 | 10/2008 |

*Primary Examiner* — Rodney B White
(74) *Attorney, Agent, or Firm* — Reising Ethington P.C.

(57) ABSTRACT

A raisable seat for a vehicle, comprising a frame for a seating portion, a rail, a raising mechanism suitable for moving the seating portion frame relative to the rail between a lowered position and a raised position, said raising mechanism comprising on each side of the seat at least one connecting rod, said connecting rod having a rod body with an upper end connected to the frame and a lower end connected to the rail, at least one connecting rod also comprising a protuberance extending from the lower end, the protuberance extending facing the rail, said connecting rod being adapted to deform, in the event of an impact, between a first state in which a gap separates the rail and the protuberance regardless of the position of the seating portion frame between the lowered position and the raised position, and a second state in which the protuberance is in contact at least locally with the rail.

16 Claims, 6 Drawing Sheets

(56) References Cited

U.S. PATENT DOCUMENTS

| | | | | |
|---|---|---|---|---|
| 7,766,427 B2* | 8/2010 | Kojima | B60N 2/06 | |
| | | | 297/344.15 X | |
| 8,353,558 B2* | 1/2013 | Okamoto | B60N 2/1615 | |
| | | | 297/216.1 | |
| 8,596,721 B2* | 12/2013 | Ozawa | B60N 2/165 | |
| | | | 297/344.15 X | |
| 8,985,686 B2* | 3/2015 | Breitfeld | B60N 2/1615 | |
| | | | 297/216.16 | |
| 8,998,325 B2* | 4/2015 | Jonsson | B60N 2/42727 | |
| | | | 297/216.15 | |
| 2006/0001306 A1* | 1/2006 | Becker | B60N 2/002 | |
| | | | 297/344.15 | |
| 2007/0194613 A1* | 8/2007 | Kojima | B60N 2/0705 | |
| | | | 297/344.15 | |
| 2007/0284922 A1* | 12/2007 | Matsuhashi | B60N 2/1615 | |
| | | | 297/216.2 | |
| 2009/0218868 A1* | 9/2009 | Koga | B60N 2/1839 | |
| | | | 297/344.17 | |
| 2011/0241391 A1* | 10/2011 | Lamparter | B60N 2/24 | |
| | | | 297/216.1 | |
| 2012/0074743 A1* | 3/2012 | Asakura | B60N 2/1615 | |
| | | | 297/216.1 | |
| 2012/0286553 A1* | 11/2012 | Sharda | B60N 2/688 | |
| | | | 297/344.15 | |
| 2013/0147241 A1 | 6/2013 | Park et al. | | |
| 2013/0300164 A1* | 11/2013 | Jonsson | B60N 2/42727 | |
| | | | 297/216.1 | |
| 2014/0183918 A1* | 7/2014 | Kaku | B60N 2/002 | |
| | | | 297/344.15 | |
| 2014/0216241 A1* | 8/2014 | Lamparter | B60N 2/502 | |
| | | | 89/36.08 | |
| 2014/0216242 A1* | 8/2014 | Lamparter | B60N 2/502 | |
| | | | 89/36.08 | |
| 2014/0339874 A1* | 11/2014 | Behrens | B60N 2/1615 | |
| | | | 297/344.15 | |
| 2015/0352986 A1* | 12/2015 | Fujita | B60N 2/68 | |
| | | | 297/216.1 | |
| 2016/0107549 A1* | 4/2016 | Janicek | B60N 2/0722 | |
| | | | 297/216.1 | |
| 2017/0327008 A1* | 11/2017 | Schulz | B60N 2/1615 | |

* cited by examiner

RAISING SYSTEM FOR VEHICLE SEAT

TECHNICAL FIELD

The present invention relates to raisable seats for motor vehicles comprising a frame for a seating portion, a longitudinal rail, a raising mechanism suitable for moving the seating portion frame relative to the longitudinal rail between a lowered position and a raised position, said raising mechanism comprising on each side of the seat at least one connecting rod, said connecting rod having a rod body with an upper end connected to the frame and a lower end connected to the rail.

BACKGROUND

In the known prior art, for example such as patent FR0702804, the connecting rods of the raising mechanism have an elongate shape that is substantially symmetrical with respect to an axis perpendicular to the direction joining the two ends.

In the event of a frontal crash, it is common for the connecting rod to be subjected to torsion about the direction of travel X of the vehicle. There is also a risk of vertical crushing along the Z axis.

It is therefore necessary to improve the raising mechanism in order to limit the lateral displacement of the seat and prevent the seat from collapsing towards the door and/or the console, in case of a frontal crash. It is also necessary to prevent a vertical collapse of the front part of the seat.

SUMMARY

To this end, in one aspect the invention proposes a raisable seat for a motor vehicle wherein at least one connecting rod also comprises a protuberance extending from the lower end, the protuberance extending facing the longitudinal rail, said connecting rod being adapted to deform, in the event of an impact, between a first state in which a gap separates the longitudinal rail and the protuberance regardless of the position of the seating portion frame between the lowered position and the raised position, and a second state in which the protuberance is in contact at least locally with the longitudinal rail.

By virtue of these arrangements, in the event of an impact, the planar contact between the protuberance and the rail absorbs part of the force, limiting the deformation of the connecting rod about axis X and along Z. The gap reserved between the protuberance and the rail, during normal operation, reduces friction and thus prevents premature wear of the surface of the protuberance and the irritating noises associated with continuous friction.

In various embodiments of the invention, use may possibly be made of one or more of the following arrangements:
- the shape of the protuberance is adapted to enable planar support of the protuberance on the longitudinal rail during contact in the second state,
- the protuberance extends continuously from the body of the connecting rod with no discontinuity in the material,
- the protuberance has a shape locally complementary to the shape of the rail,
- the longitudinal rail comprises a movable profile and a fixed profile, the protuberance comprising a portion facing the fixed profile,
- the movable profile comprises a horizontal upper web and at least one lateral wing extending substantially vertically downwards from the horizontal upper web, and the fixed profile comprises at least one horizontal wing extended by a hanging end wall, said hanging end wall facing a lateral wing of the movable profile, the protuberance extending substantially parallel to and close to the horizontal wing of the fixed profile,
- the protuberance comprises a first part facing the movable profile and a second part facing the fixed profile,
- the movable profile comprises a horizontal upper web and at least one lateral wing extending substantially vertically downwards from the horizontal upper web, the fixed profile comprising at least one horizontal wing extended by a hanging end wall, said hanging end wall facing a lateral wing of the movable profile, the protuberance comprising a first portion substantially parallel to and close to the horizontal upper web of the movable profile, a second portion substantially parallel to and close to said lateral wing of the movable profile, and a third portion substantially parallel to and close to the horizontal wing of the fixed profile,
- the seat comprises a base mounted on the longitudinal rail, the raising mechanism being atop the base, the lower end of the connecting rod being connected to the base.
- the base is connected to the connecting rod by a pin, the third portion having an extension along the lower end of the body of the connecting rod that is smaller than the first portion and the second portion, the extension of the third portion along the lower end of the body of the connecting rod corresponding to an angular portion around the pin of between 60° and 120°,
- the end of the third portion has the shape of an arc of a circle,
- the longitudinal rail comprises a movable profile and a fixed profile, the movable profile comprising a horizontal upper web and at least one lateral wing extending substantially vertically downwards from the horizontal upper web, the fixed profile comprising at least one horizontal wing extended by a hanging end wall, said hanging end wall facing a lateral wing of the movable profile, the protuberance being formed by a single portion that is both substantially parallel to and close to the lateral wing and substantially parallel to and close to the horizontal wing,
- the protuberance extends along only a portion of the lower end of the body of the connecting rod,
- a free end of the protuberance has a shape adapted to maintain a substantially constant gap between said free end and the longitudinal rail during the travel of the connecting rod to move the seat between the lowered position and the raised position, in the first state,
- the connecting rod is a front connecting rod.
- the seat comprises a rear connecting rod, the rear connecting rod also comprising a protuberance extending from the lower end of the rear connecting rod, the protuberance extending facing the longitudinal rail.

BRIEF DESCRIPTION OF DRAWINGS

Other aspects, objects, and advantages of the invention will be apparent from reading the following description of one of its embodiments given by way of non-limiting example, with the aid of the accompanying drawings in which.

DETAILED DESCRIPTION

Figure 1A:
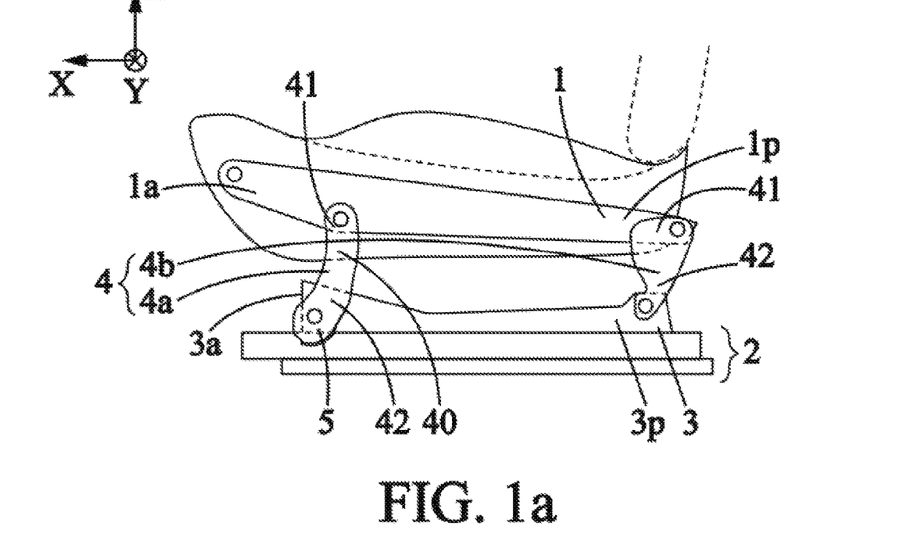
FIGS. 1a and 1b are partial schematic views of a seat structure comprising a raising mechanism, in the raised and lowered position respectively.
Figure 1B:
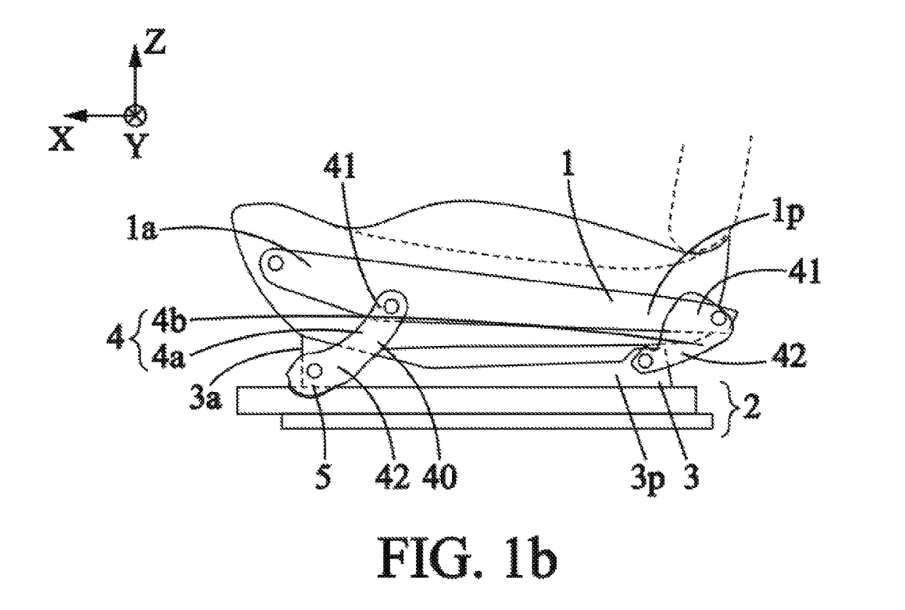

FIG. 1 shows a schematic and partial representation of a vehicle seat comprising a seating portion with a frame 1, a backrest being mounted on the seating portion, the entirety being mounted on a rail 2 via a raising mechanism 4. In the present case, a base 3 is on top of the rail 2, the raising mechanism 4 being mounted on the base 3. The base 3 is secured to the rail 2. The base 3 may be a separate part from the rail 2 or may be formed integrally with the rail 2.

This raising mechanism 4 is designed to move the seating portion with respect to the base in at least one substantially vertical direction Z.

This raising mechanism is obtained by means of connecting rods 4a; 4b.

For example, for each of said connecting rods, the lower end is connected to the rail 2 and the upper end is connected to the frame 1 of the seating portion of the seat.

The seating portion frame 1 generally has a right side and a left side of similar architectures; only one side is shown in FIG. 1, and therefore there are other connecting rods between the seating portion and the rail on the side not shown, equivalent to the connecting rods 4a; 4b represented.

A front connecting rod 4a connects the rail 2 to a front part 1a of the seating portion frame 1 and a rear connecting rod 4b connects the rail 2 to a rear part 1p of the frame 1. More precisely, in the illustrated example, a front connecting rod 4a connects the front part 3a of the base 3 (pivotable mounting on pin referenced 31) to a front part 1a of the frame 1 of the seating portion (pivotable mounting on pin referenced 11), and a rear connecting rod 4b connects the rear part 3p of the base 3 (pivotable mounting on pin referenced 32) to the rear part 1p of the frame 1 (pivotable mounting on pin referenced 12). In the example illustrated, the pivotable mountings of the first and second connecting rods 4a; 4b are all on pins parallel to the transverse axis Y, which is perpendicular to the longitudinal axis X and perpendicular to the vertical axis Z.

The connecting rods 4a, 4b may be moved independently by respective control means or may be controlled simultaneously by synchronized control means or by a mechanical connection which can connect them.

When the front connecting rod 4a is pivoted in a counterclockwise direction by the raising mechanism 4, then the front part connected to the seating portion is raised upwards; whereas conversely, when the front connecting rod 4a is pivoted in a clockwise direction, then the front part of the seating portion is lowered towards the floor. Similarly, when the rear connecting rod 4b is pivoted in the counterclockwise direction, then the rear part of the seating portion is raised upwards; while when the rear connecting rod 4b is rotated in a clockwise direction, the rear part of the seating portion is lowered towards the floor.

When controlling the system of connecting rods 4a, 4b, the seating portion is moved substantially parallel to the floor, which is referred to as a "raising" movement as illustrated in FIGS. 1a (raised position) and 1b (lowered position). Between the lowered and raised positions, the connecting rods 4a, 4b are pivoted by approximately 30 degrees in the counterclockwise direction, which defines the path of the connecting rods between the lowered position and the raised position.

The front connecting rod 4a (or rear connecting rod 4b) is for example integrally connected to a transverse bar extending along the transverse axis Y and connecting the connecting rod represented to an equivalent connecting rod arranged on the other side of the seating portion structure (not shown).

Figure 2A:
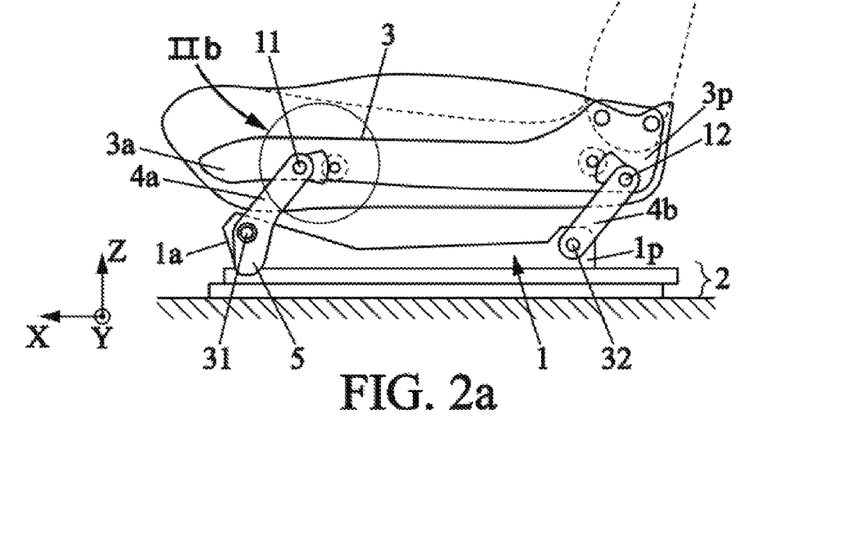
FIG. 2a is a partial schematic view of the device for driving the connecting rods.
Figure 2B:
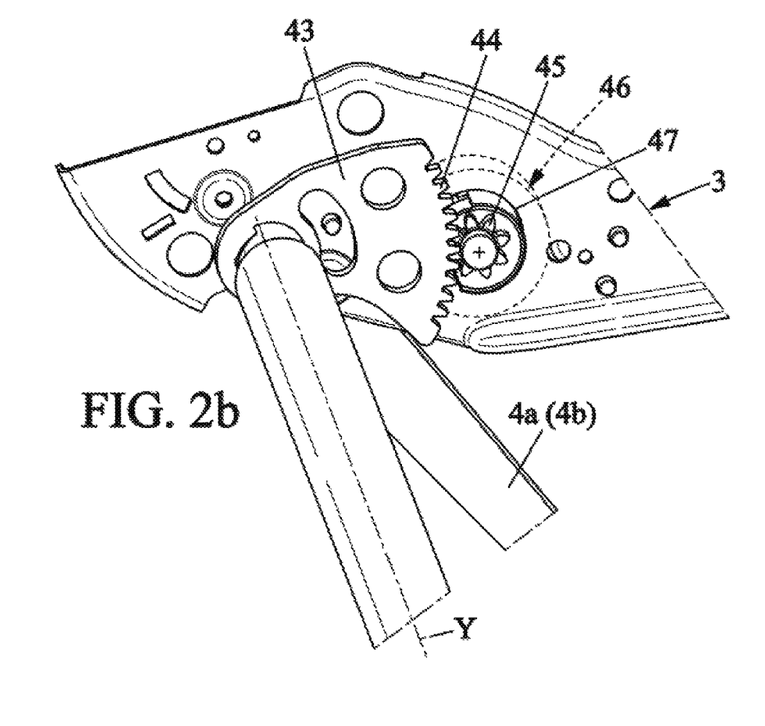
FIG. 2b shows a detail view of the device for driving a front connecting rod.

As illustrated in FIGS. 2a and 2b, the front connecting rod 4a is for example integrally connected to a control plate 43 which is shown as a metal plate extending in a plane X, Z (detail of FIG. 2b). This control plate 43 is connected directly to the transverse bar and/or to the connecting rod 4a and comprises, on an end section of substantially circular shape, a toothed area 44 intended to engage with a driving device, for example a motorized device 46, which comprises a pinion 45 directly engaging with the aforementioned toothed area 44.

Preferably, such a driving device is provided only on one side of the frame 1 of the seating portion of the seat; the other side may not have one. The pinion is arranged so as to rotate about an axis A substantially parallel to the transverse axis Y.

A protective housing 47 may be provided to partially or almost completely cover the pinion 45 with the exception of the area engaging with the toothed section.

If appropriate, a second driving device similar to the first may be provided for driving the rear connecting rod 4b in a similar manner.

The base 3 is mounted so as to slide with respect to the floor of the vehicle by means of longitudinal rails 2 comprising a fixed profile 21 fixed to the floor of the vehicle and a movable profile 22 integral to the aforementioned base 3 and sliding in the longitudinal direction X on the fixed profile 21. In particular, the base 3 may be made as one piece with the movable profile 22 of the rail 2. The base 3 and the movable profile 22 are then in the form of a single part.

According to the embodiment illustrated in FIGS. 1a, 1b, and 2a, the base 3 extends along the longitudinal direction X between the front part 3a and the rear part 3p. However, this embodiment is not limiting and the base 3 may comprise front and rear parts separate from one another.

The fixed 21 and movable 22 profiles are for example of metal. For example, the fixed 21 and movable 22 profiles fit into one another to define a hollow internal space. For example, the movable profile 22 is a male profile and the fixed profile 21 is a female profile.

Figure 3A:
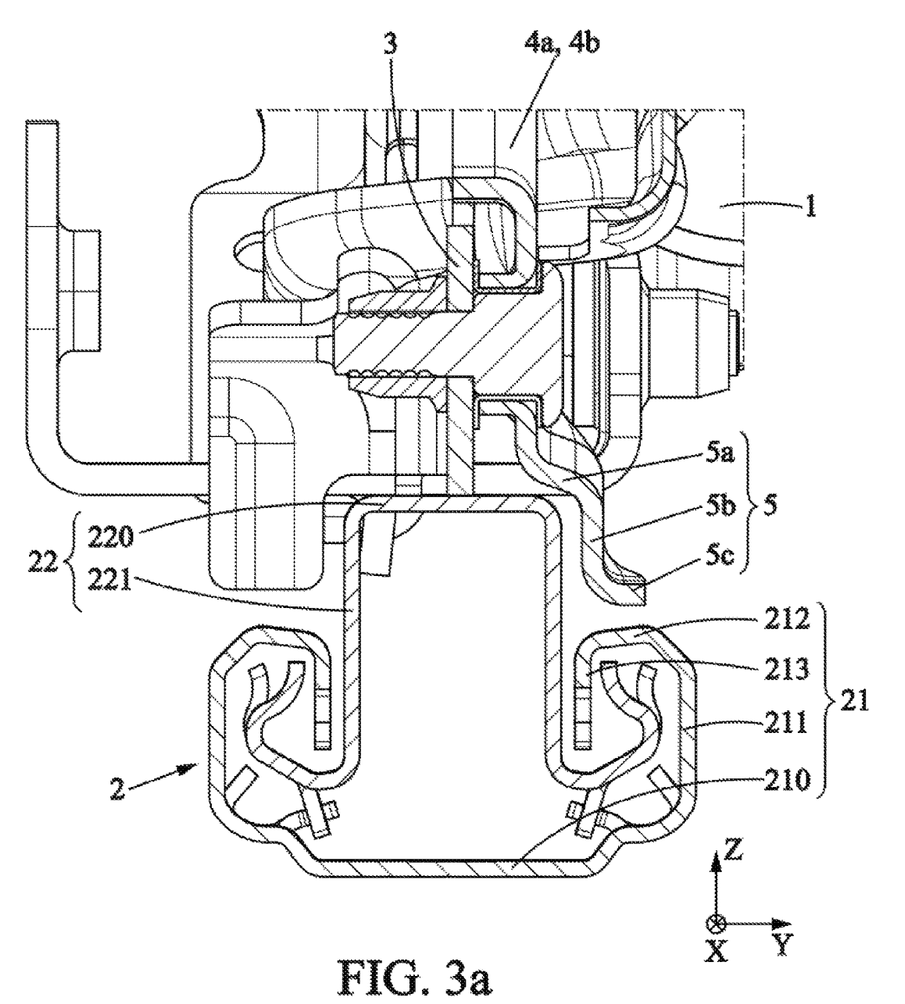
FIGS. 3a, 3b, and 3c are cross-sections of the front connecting rod mounted on the base between the rail and the seating portion frame in three different embodiments.

As represented in FIG. 3a and by way of example, the movable profile 22 may have a substantially U-shaped cross-section. The movable profile 22 may comprise a horizontal upper web 220 fixed to the seating portion of the seat. The movable profile may further comprise two lateral wings 221 which each extend substantially vertically downwards from the seating portion. The fixed profile 21 may also have a U-shaped cross-section, with a horizontal lower web 210 fixed to the floor of the vehicle and extending parallel to the web of the movable profile, and two lateral wings 211 each extending substantially vertically upward from the lower web. At least one of the lateral wings 211 of the fixed profile extends to form an inward trough having a substantially vertical hanging end wall 213, a horizontal wing 212 connecting the lateral wing and the hanging end wall.

Figure 4A:
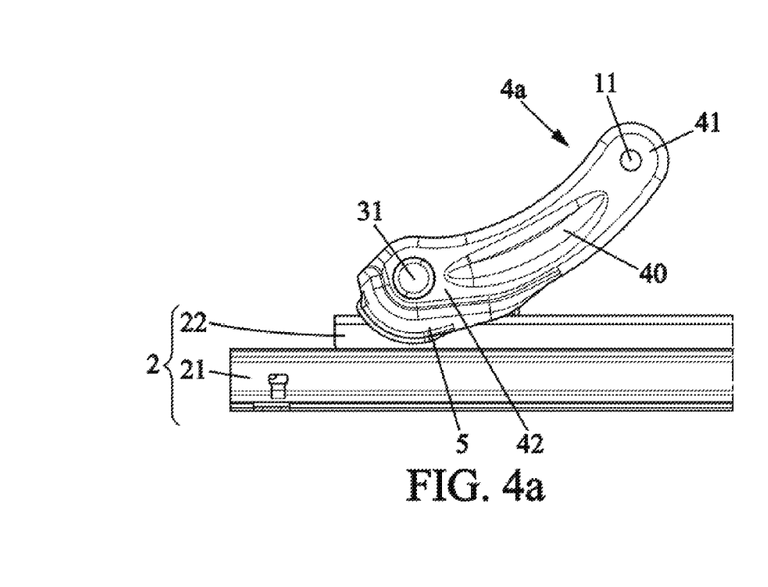
FIGS. 4a and 4b are side views of the front connecting rod in the first embodiment, respectively in the lowered position and raised position.
Figure 4B:
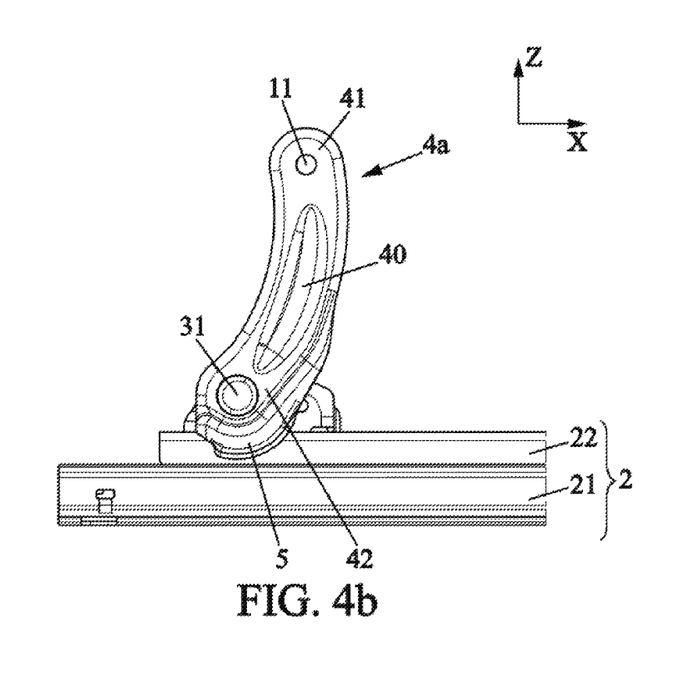

The front connecting rod 4a comprises a rod body 40 with a substantially elongate shape. The rod body is substantially symmetrical with respect to an axis perpendicular to the direction connecting an upper end 41 and a lower end 42 of the connecting rod. The connecting rod 4a is in particular slightly incurved within the plane in which it travels from the lowered position to the raised position. As illustrated in FIGS. 4a and b, the front connecting rod 4a according to the invention has a protuberance 5 extending from the lower end of the rod body 40. As a variant, the rear connecting rod 4b may also have a protuberance 5' with for example the same properties as those described below. This protuberance 5 is for example formed by material continuous with the lower end 42 of the body of the front connecting rod 4a. For example, the front connecting rod 4a is obtained by shaping a metal structural part.

The protuberance 5 extends facing the longitudinal rail 2. More particularly, the protuberance 5 has a shape locally complementary to the shape of the rail 2.

The protuberance 5 is shaped on the external side of the connecting rod, meaning the side opposite to the side of the connecting rod intended to be positioned between the two lateral rails of the seat. The protuberance 5 is also shaped on the side near the center of the vehicle, or the external side of the vehicle which is opposite to the side near the center of the vehicle.

The protuberance 5 will advantageously bear against the fixed profile of the rail in each of the embodiments.

In a first embodiment, the protuberance 5 has three portions extending substantially concentrically with respect to axis 31. A first portion 5a extends from the lower end 42 of the body of the connecting rod 40, along only a portion of the lower end 42. A second portion 5b of the same or less extent along the lower end 42 as the first portion 5a extends from the first portion. A third portion 5c of the same or less extent as the second portion 5b extends from the second portion 5b. In plane Y, Z, as illustrated in FIG. 3a, the set of three portions 5a, 5b, 5c thus forms two consecutive bends, forming a shape locally complementary to the shape of the longitudinal rail in cross-section in the plane transverse to X.

In particular, the protuberance 5 comprises a first portion substantially parallel to the horizontal upper web of the movable profile 22, a second portion substantially parallel to said lateral wing of the movable profile 22, and a third portion substantially parallel to the horizontal wing of the fixed profile 21. The protuberance 5 therefore has a shape that is locally substantially complementary to the shape of the rail 2, enabling planar support of the various portions of the protuberance 5 against the rail 2 when the connecting rod 4a is in contact with the rail 2 in plane X, Z and in plane X, Y.

In plane X, Z, the end of the protuberance 5 also has a general shape adapted to allow planar support of the end of the protuberance 5 against the rail 2 in the event of unusual stress (a crash) along Z, regardless of the position of the connecting rod in its travel. The end of the protuberance also has a shape adapted to maintain a gap between the end of the protuberance of the connecting rod 4a and the rail 2, regardless of the position of the connecting rod in its travel.

The end of the protuberance has in particular the shape of an arc of a circle about axis 31, which allows the end of the protuberance to be parallel to the rail regardless of the position of the connecting rod in its travel, and to maintain a substantially constant gap between the connecting rod 4a and the rail 2 along the entire travel of the connecting rod 4a.

Figure 3B:
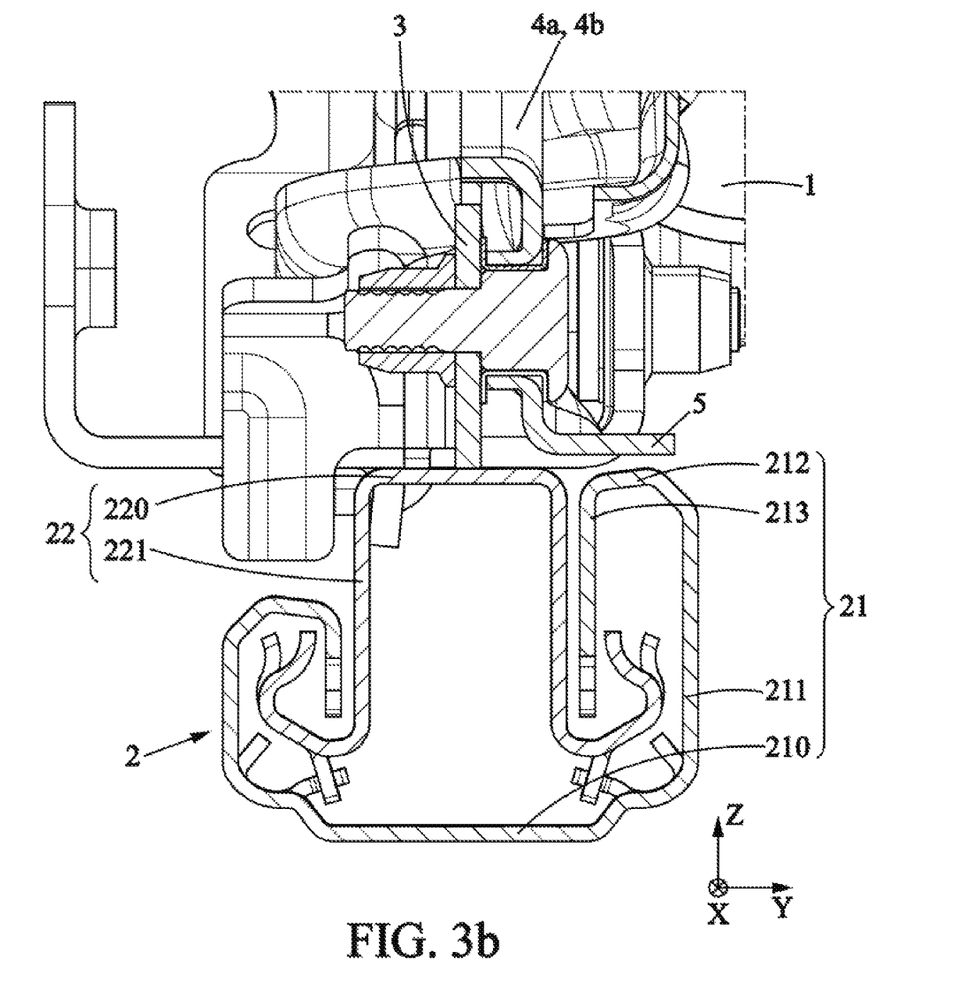

In a second embodiment illustrated in FIG. 3b, the protuberance 5 extends substantially parallel to and close to the horizontal wing 212 of the fixed profile 21. The protuberance 5 has a shape locally and substantially complementary to the shape of the rail 2, allowing planar support of the protuberance 5 against the rail 2 when the connecting rod 4a is brought into contact with the rail 2 in plane X, Y.

Figure 3C:
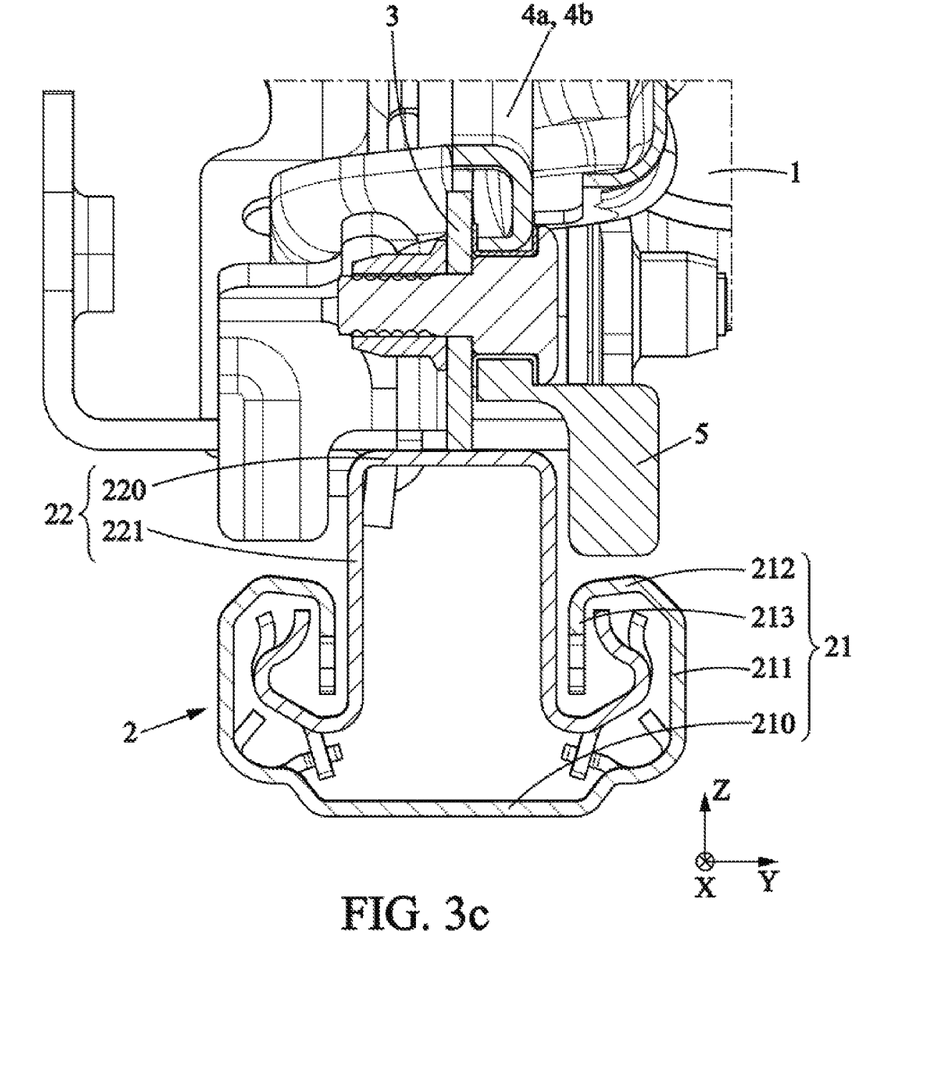

In a third embodiment illustrated in FIG. 3c, the protuberance 5 is formed by a single portion that is both substantially parallel to and close to the lateral wing (221) and substantially parallel to and close to the horizontal wing. In this embodiment, the protuberance 5 will be thick, meaning that the protuberance will have a substantially rectangular cross-section in the section plane (Y, Z) having two adjacent sides one extending parallel to the horizontal wing 212 and the other parallel to the lateral wing 221. The protuberance 5 therefore has a shape locally and substantially complementary to the shape of the rail 2, allowing planar support of the protuberance 5 against the rail 2 when the connecting rod 4a is brought into contact with the rail 2 in plane X, Z and in plane X, Y.

The protuberance 5 extends along only a portion of the lower end 42 of the body 40 of the front connecting rod 4a.

In particular, in the first embodiment, the extent of the protuberance 5 decreases continuously from the first portion 5a to the second portion 5b, and then from the second portion 5b to the third portion 5c.

In particular, the third portion 5c has an extension along the lower end 42 of the body 40 of the front connecting rod 4a that is strictly smaller than those of the second portion 5b or the first portion 5a, the decreased size forming a "step" between the two portions. The extension of the third portion 5c along the lower end 42 of the body 40 of the front connecting rod 4a corresponds to an angular portion around the pin 31 that is between 60° and 120°.

In the "normal" first state of operation of the raising mechanism, a gap is maintained between the longitudinal rail 2 and the protuberance 5, and this remains so throughout the travel of the connecting rod 4a relative to the rail 2.

In the case of a frontal impact, in the second state, the connecting rod 4a tends to deform. The protuberance 5 is pressed against the rail 2, which limits the possible movements of the connecting rod 4a around X and along Z.

In the first embodiment, the first portion 5a comes into planar contact with the upper web 220, or the second portion 5b comes into planar contact with the lateral wing 221 of the movable profile 22, or the third portion 5c comes into planar contact with the horizontal wing 212 of the fixed profile 21.

Thus, the contact between the first portion 5a and the upper web 220 limits the vertical collapse of the seat, meaning of the frame onto the base. The contact between the third portion 5c and the horizontal wing 212 has the same effect. The contact between the second portion 5b and the lateral wing 221 of the movable profile 22 absorbs a portion of the torsional torque about axis X generated by a frontal impact, thus limiting the lateral buckling of the seat.

The invention claimed is:

1. Raisable seat for a motor vehicle, comprising:
   a frame for a seating portion,
   a longitudinal rail,
   a raising mechanism suitable for moving the seating portion frame relative to the longitudinal rail between a lowered position and a raised position, said raising mechanism comprising, on each side of the seat, one connecting rod, said connecting rod having a rod body with an upper end connected to the frame and mounted pivotable on a first pin, and a lower end connected to the longitudinal rail and mounted pivotable on a second pin, wherein:
   said connecting rod also comprises a protuberance extending from the lower end, the protuberance extending facing the longitudinal rail and located such that the second pin is located between said protuberance and the first pin, said connecting rod being adapted to deform, in the event of an impact, between a first state in which a gap separates the longitudinal rail and the protuberance, regardless of the position of the seating portion frame between the lowered position and the raised position, and a second state in which the protuberance is in contact locally with the longitudinal rail.

2. Seat for motor vehicle according to claim 1, wherein the shape of the protuberance is adapted to enable planar support of the protuberance on the longitudinal rail during contact in the second state.

3. Seat for motor vehicle according to claim 1, wherein the protuberance extends continuously from the body of the connecting rod with no discontinuity in the material.

4. Seat for motor vehicle according to claim 1, wherein the protuberance has a shape locally complementary to the shape of the rail.

5. Seat for motor vehicle according to claim 1, wherein the longitudinal rail comprises a movable profile and a fixed profile, the protuberance comprising a portion facing the fixed profile.

6. Seat for motor vehicle according to claim 5, wherein:
the movable profile comprises a horizontal upper web and one lateral wing extending vertically downwards from the horizontal upper web,
the fixed profile comprises one horizontal wing extended by a hanging end wall, said hanging end wall facing the lateral wing of the movable profile,
the protuberance extends parallel to and close to the horizontal wing of the fixed profile.

7. Seat for motor vehicle according to claim 5, wherein the protuberance comprises a first part facing the movable profile and a second part facing the fixed profile.

8. Seat for motor vehicle according to claim 7, wherein:
the movable profile comprises a horizontal upper web and one lateral wing extending vertically downwards from the horizontal upper web,
the fixed profile comprises one horizontal wing extended by a hanging end wall, said hanging end wall facing a lateral wing of the movable profile,
the protuberance comprises a first portion parallel to and close to the horizontal upper web of the movable profile, a second portion parallel to and close to said lateral wing of the movable profile, and a third portion parallel to and close to the horizontal wing of the fixed profile.

9. Seat for motor vehicle according to claim 8, the third portion having an extension along the lower end of the body of the connecting rod that is smaller than the first portion and the second portion, the extension of the third portion along the lower end of the body of the connecting rod corresponding to an angular portion around the pin of between 60° and 120°.

10. Seat for motor vehicle according to claim 8, wherein the end of the third portion has the shape of an arc of a circle.

11. Seat for motor vehicle according to claim 1, comprising a base atop the longitudinal rail, the raising mechanism being mounted on the base, the lower end of the connecting rod being connected to the base and mounted pivotable on the first pin.

12. Seat for motor vehicle according to claim 1, wherein the longitudinal rail comprises a movable profile and a fixed profile,
the movable profile comprising a horizontal upper web and one lateral wing extending vertically downwards from the horizontal upper web,
the fixed profile comprising one horizontal wing extended by a hanging end wall, said hanging end wall facing a lateral wing of the movable profile,
the protuberance being formed by a single portion that is both parallel to and close to the lateral wing and parallel to and close to the horizontal wing.

13. Seat for motor vehicle according to claim 1, wherein the protuberance extends along only a portion of the lower end of the body of the connecting rod.

14. Seat for motor vehicle according to claim 1, wherein a free end of the protuberance has a shape adapted to maintain a constant gap between said free end and the longitudinal rail during the travel of the connecting rod to move the seat between the lowered position and the raised position, in the first state.

15. Seat for motor vehicle according to claim 1, wherein the connecting rod is a front connecting rod.

16. Seat for motor vehicle according to claim 15, comprising a rear connecting rod, the rear connecting rod also comprising a protuberance extending from the lower end of the rear connecting rod, the protuberance extending facing the longitudinal rail.

* * * * *